US009582912B2

United States Patent
Levy et al.

(10) Patent No.: US 9,582,912 B2
(45) Date of Patent: Feb. 28, 2017

(54) DEVICE FOR AIDING THE PRODUCTION OF A MESH OF A GEOMETRIC DOMAIN

(75) Inventors: Bruno Levy, Rosieres aux Salines (FR); Liu Yang, Beijing (CN)

(73) Assignee: INRIA INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 1026 days.

(21) Appl. No.: 13/808,801

(22) PCT Filed: Jul. 6, 2011

(86) PCT No.: PCT/FR2011/051608
§ 371 (c)(1),
(2), (4) Date: Mar. 18, 2013

(87) PCT Pub. No.: WO2012/004531
PCT Pub. Date: Jan. 12, 2012

(65) Prior Publication Data
US 2013/0169657 A1   Jul. 4, 2013

(30) Foreign Application Priority Data
Jul. 9, 2010 (FR) .................................. 10 02920

(51) Int. Cl.
*G06T 11/60* (2006.01)
*G06T 17/20* (2006.01)

(52) U.S. Cl.
CPC .............. *G06T 11/60* (2013.01); *G06T 17/20* (2013.01); *G06T 17/205* (2013.01)

(58) Field of Classification Search
None
See application file for complete search history.

(56) References Cited

PUBLICATIONS

Du (Qiang Du, Desheng Wang in "Anisotropic Centroidal Voronoi Tessellations and Their Applications", Siam Journal on Scientific Computing Siam USA, vol. 26, #3, 2005, p. 737-761).*
Sheffer (Engineering With Computers, 1999, vol. 15, No. 3, p. 248 A. Sheffer, M. Etzion, A. Rappoport, M. Bercovier).*
Du Q et al; "Anisotropic centroidal Voronoi tessellations and their applications", Siam Journal on Scientific Computing Siam USA, vol. 26, No. 3, 2005, pp. 737-761, XP002623655.

(Continued)

Primary Examiner — Maurice L McDowell, Jr.
(74) Attorney, Agent, or Firm — Troutman Sanders LLP

(57) ABSTRACT

Device for aiding the production of a mesh, includes storing first numerical data defining a surface to be processed, a partitioner calculating three-dimensional work cells given initial points, each work cell associated with a point in space, a tiling tool actuating the partitioner with a first set of initial points, defined with respect to the surface, so as to obtain a first set of work cells, an evaluator calculating a cumulative quantity representing the sum of the moments of the points of the work cells with respect to their associated points, and an optimizer iteratively actuating the tiling tool and the evaluator with a set of initial points drawn from the previous sets, according to a rule calculated to minimize said cumulative quantity. The moments are determined by a chosen nonnative function, of order higher than or equal to two and/or according to an adaptation matrix representing an anisotropy field.

21 Claims, 7 Drawing Sheets

(56) References Cited

PUBLICATIONS

Yan D-M et al; "Isotropic remeshing with fast and exact computation of restricted voronoi diagram", Computer Graphics Forum, vol. 28, No. 5, Jul. 2009 (Jul. 2009), pp. 1445-1454, XP002623656, Blackwell Publishing Ltd, GBR.

Viswanath, Naveen et al; "Quadrilateral Meshing with Anisotropy and Directionality Control via Close Packing of Rectangular Cells", Proceedings, 9th International Meshing Roundtable, Oct. 2, 2000 (Oct. 2, 2000), Oct. 5, 2000 (Oct. 5, 2000), XP002623928, Sandia National Laboratories.

Chen et al; "Optimal anisotropic meshes for minimizing interpolation errors in Lp-norm", Math. Comp, vol. 76, Sep. 15, 2006 (Sep. 15, 2006), pp. 179-204, XP002623657.

International Search Report, dated May 11, 2012, which issued during the prosecution of International Patent Application No. PCT/FR2011/051608, of which the present application is the national phase.

* cited by examiner

Tab1      1000

| q1 | qx1 | qy1 | qz1 |
|----|-----|-----|-----|
| q2 | qx2 | qy2 | qz2 |
| q3 | qx3 | qy3 | qz3 |
| . | . | . | . |
| qj | qxj | qyj | qzj |
| . | . | . | . |

Fig. 2

Tab2      1002

| T1 | q1 | q2 | q3 |
|----|----|----|----|
| T2 | q4 | q5 | q6 |
| T3 | q7 | q8 | q9 |
| . | . | . | . |
| Tj | qm | qn | qp |

Fig. 3

Tab3      1004

| T1 | N1x | N1y | N1z | B1 |
|----|-----|-----|-----|-----|
| T2 | N2x | N2y | N1z | B2 |
| T3 | N3x | N3y | N1z | B3 |
| . | . | . | . | . |
| Tj | Njx | Nyj | Njz | Bj |
| . | . | . | . | . |

Fig. 4

Tab4      1006

| X1 | x1 | y1 | z1 |
|----|----|----|----|
| X2 | x2 | y2 | z2 |
| X3 | x3 | y3 | z3 |
| . | . | . | . |
| Xj | xj | yj | zj |
| . | . | . | . |

Fig. 5

Tab5      1008

| P1 | N1x | N1y | N1z | B1 | V1 | V2 |
|----|-----|-----|-----|-----|----|----|
| P2 | N2x | N2y | N2z | B2 | V1 | V3 |
| P3 | N3x | N3y | N3z | B3 | V1 | V4 |
| P4 | N4x | N4y | N4z | B4 | V1 | V5 |
| P5 | N5x | N5y | N5z | B5 | V1 | V6 |
| P6 | N6x | N6y | N6z | B6 | V1 | V7 |
| P7 | N7x | N7y | N7z | B7 | V1 | V8 |
| . | . | . | . | . | . | . |
| Pj | Njx | Njy | Njz | Bj | Vk | Vl |
| . | . | . | . | . | . | . |

Fig. 6

Tab6      1010

| S1 | S1x | S1y | S1z | R1 | L1 | Symb |
|----|-----|-----|-----|----|----|------|
| S2 | S2x | S2y | S2z | R2 | L1 | Symb |
| S3 | S3x | S3y | S3z | R3 | L1 | Symb |
| S4 | S4x | S4y | S4z | R4 | L1 | Symb |
| S5 | S5x | S5y | S5z | R5 | L2 | Symb |
| S6 | S6x | S6y | S6z | R6 | L2 | Symb |
| . | . | . | . | . | . | . |
| Sj | Sjx | Sjy | Sjz | Rj | Lk | Symb |
| . | . | . | . | . | . | . |

Fig. 7

Tab7      1012

| L1 | X1 |
|----|----|
| L2 | X1 |
| . | . |
| Lj | Xi |

Fig. 8

Tab8      1014

| T1 | C11 | C12 | C13 | D1 |
|----|-----|-----|-----|-----|
| T2 | C21 | C22 | C23 | D2 |
| T3 | C31 | C32 | C33 | D3 |
| . | . | . | . | . |
| Tj | Cj1 | Cj2 | Cj3 | Dk |
| . | . | . | . | . |

Fig. 9

Tab9                                     1016

| q1 | qx1 | qy1 | qz1 | M1 |
|---|---|---|---|---|
| q2 | qx2 | qy2 | qz2 | M1 |
| q3 | qx3 | qy3 | qz3 | M1 |
| . | . | . | . | . |
| . | . | . | . | . |
| qj | qxj | qyj | qzj | Mk |
| . | . | . | . | . |
| . | . | . | . | . |

Fig. 13

Tab10                                         1018

| P1 | N1x | N1y | N1z | B1 | M1 |
|---|---|---|---|---|---|
| P2 | N2x | N2y | N2z | B2 | M1 |
| P3 | N3x | N3y | N3z | B3 | M1 |
| P4 | N4x | N4y | N4z | B4 | M1 |
| P5 | N5x | N5y | N5z | B5 | M1 |
| P6 | N6x | N6y | N6z | B6 | M1 |
| P7 | N7x | N7y | N7z | B7 | M1 |
| . | . | . | . | . | . |
| . | . | . | . | . | . |
| Pj | Njx | Njy | Njz | Bj | Mk |
| . | . | . | . | . | . |
| . | . | . | . | . | . |

Fig. 14

Tab11                                     1020

| q1 | qx1 | qy1 | qz1 | M1 |
|---|---|---|---|---|
| q2 | qx2 | qy2 | qz2 | M2 |
| q3 | qx3 | qy3 | qz3 | M3 |
| . | . | . | . | . |
| . | . | . | . | . |
| qj | qxj | qyj | qzj | Mj |
| . | . | . | . | . |
| . | . | . | . | . |

Fig. 15

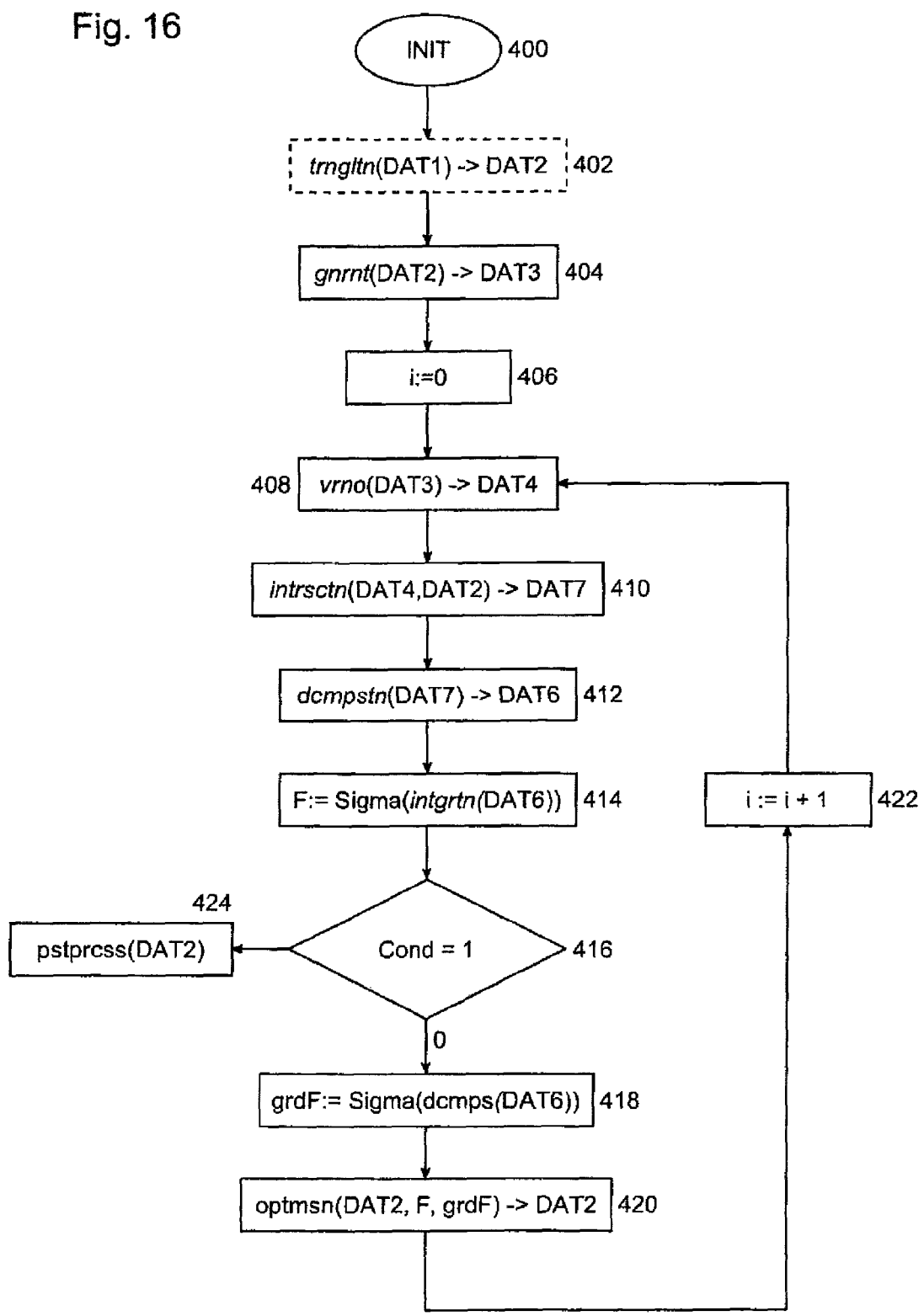

DEVICE FOR AIDING THE PRODUCTION OF A MESH OF A GEOMETRIC DOMAIN

CROSS-REFERENCE TO RELATED APPLICATIONS

This application is a National Stage of International Application PCT/FR2011/051608 filed Jul. 6, 2011 ("PCT '608") and published as WO 2012/004531 on Jan. 12, 2012. PCT '608 claims priority to French Application No. 10/02920 filed Jul. 9, 2010. All applications are herein incorporated by reference.

FIELD OF INVENTION

The invention relates to a device and a method for aiding the production of a mesh of a spatially defined geometric domain. The domain to be meshed may comprise a surface, or a combination of several surfaces, and/or a volume at least partially delimited by one or more surfaces, or a combination of volumes thus defined.

BACKGROUND

The meshing consists of dividing the domain into a set of geometric elements, also called cells. Each cell and the set of cells in its entirety must meet predefined validity conditions, for example pertaining to the geometric shape of the cells (square, triangle, tetrahedron, hexahedron, cube, etc.) or apical angle values (compliance with minimum/maximum angle values). These predefined conditions depend in large part on the application for which the mesh is intended.

A number of methods exist for generating a mesh of a domain.

Known in particular are methods based on the optimization of an objective function depending on the coordinates at the apices of the cells. Such methods are sometimes called "variational methods." To define the objective function, these methods use Centroidal Voronoi Tessellation (CVT) and Optimal Delaunay Triangulation (ODT).

Variational methods make it possible to effectively and robustly generate isotropic meshes using what are called simplicial complexes. These methods are particularly effective when an anisotropic mesh is to be generated from triangular elements (meshing a surface) or tetrahedral elements (meshing a volume).

For certain applications, however, it is necessary, or at least preferable, to use meshes generated from hexahedral elements (volume), or quadrilateral-shaped elements (surface). This is for example the case for certain simulations using finite elements or numerical analyses, in particular in the field of fluid dynamics, the design of reservoirs for oil exploration, or mechanics in the plastic or highly elastic domains. In this type of application, using a executable mesh makes it possible to obtain both a more reliable simulation and a reduced number of elements to which the simulation pertains.

"Hexahedral mesh," or more accurately "dominant executable mesh," refers to a mesh primarily having hexahedral elements. A dominant hexahedral mesh may also comprise elements of different shapes, in particular tetrahedral elements, provided that the hexahedral elements are larger in number and/or volume than the elements of a different shape.

Furthermore, certain applications may require the generation of an anisotropic mesh, i.e. a mesh having elements that differ from one another in terms of size and/or orientation, in predefined zones of the domain.

To date, no fully satisfactory method exists for generating meshes from hexahedral or quadrilateral elements. The current methods require a manual intervention during the meshing operation. Furthermore, these methods have a significant calculation time, much higher than the traditional variational methods (by several orders of magnitude), which makes them nearly unusable in practice. Furthermore, they do not make it possible to define an anisotropy in the meshing.

The invention aims to improve the situation.

SUMMARY

A method is proposed for aiding the production of a mesh, including one or more computers and a memory storing first numerical data defining a surface to be processed, said first numerical data being organized according to a first data structure, a partitioner calculating three-dimensional work cells on the basis of given initial points, each of these work cells being associated with a point in space, and represented by second numerical data organized according to a second data structure, a tiling tool actuating the partitioner with a first set of initial points, defined with respect to the surface to be processed, so as to obtain a first set of work cells, an evaluator, calculating a cumulative quantity representing the sum of the moments of the points of the work cells with respect to their respective associated points, said moments being determined according to a chosen normative function, of order higher than or equal to two and/or according to an adaptation matrix representing an anisotropy field, and an optimizer iteratively actuating the tiling tool and the evaluator with, on each occasion, a set of initial points drawn from the previous sets, according to a rule calculated so as to tend to minimize said cumulative quantity.

Also proposed is a method for aiding the production of a mesh, including the following steps:
 i. storing first numerical data defining a surface to be processed;
 ii. calculating a first set of three-dimensional work cells from a first set of initial points, said work cells each being associated with a point in space;
 iii. calculating a cumulative quantity representing the sum of the moments of the points of the work cells with respect to the respective associated points of said cells, said moments being determined according to a selected normative function, of order higher than or equal to two and/or according to an adaptation matrix representing an anisotropy field;
 iv. iteratively repeating step ii. and step iii. with, on each occasion, a set of initial points drawn from the previous sets, according to a rule calculated so as to tend to minimize said cumulative quantity.

The proposed device and method first make it possible to generate a dominant hexahedral mesh robustly, i.e., without the degeneration and/or singularities that are frequently encountered, for example non-compliant triangles, artificial borders, degenerated triangles, folds and self-intersections.

Such a device and method also allow a high level of control of the mesh operation. It becomes possible to define an anisotropy field in the background, which makes it possible to specify the orientation and dimensions of the cells. This may prove essential for certain modeling using finite elements.

The proposed device and method also allow completely automatic generation of the mesh. The mesh may be generated from raw data, without requiring any input by the user, in particular no labeling of the initial data.

Because the optimizer tends to minimize the cumulative quantity owing in particular to the implementation of numerical methods, the time necessary to generate a mesh remains low, even in the case of a large mesh (between 500,000 and 1 million cells).

BRIEF DESCRIPTION OF THE DRAWINGS

Other features and advantages of the invention appear upon reading the following detailed description and examining the drawings, in which:

FIG. 2 shows a table illustrating part of a data storage structure for the device of FIG. 1;

FIG. 3 shows a table illustrating another part of the data storage structure of FIG. 2;

FIG. 4 shows a table illustrating still another part of the data storage structure of FIG. 2;

FIGS. 5 to 9, respectively, show a table illustrating part of a respective data storage structure for the device of FIG. 1;

FIGS. 13 to 15, respectively, show a table illustrating part of a respective data storage structure for the device of FIG. 12;

FIG. 16 is similar to FIG. 11 for the mesh device of FIG. 12.

DETAILED DESCRIPTION

The appended drawings may not only serve to complete the invention, but also to contribute to the definition thereof if necessary.

Figure 1:
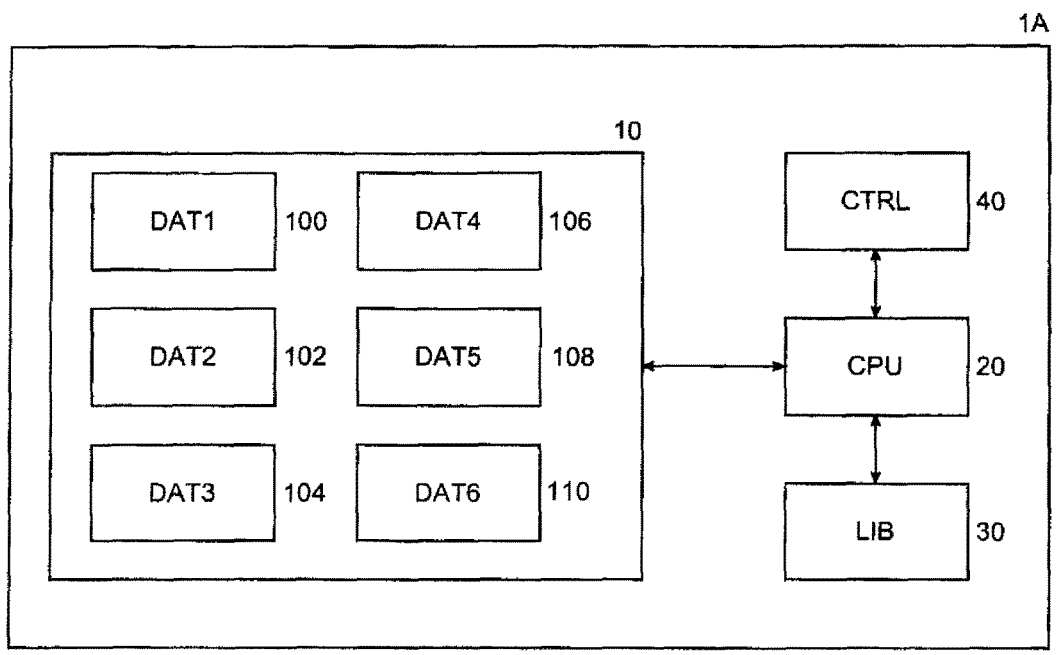
FIG. 1 shows a block diagram of a device for aiding with mesh production.

FIG. 1 shows a device 1A for aiding the production of the mesh of a domain, for use in particular when the domain in question takes the form of one or several surfaces.

The device 1A includes a memory 10, one or more processors, designated in their entirety by reference 20, and a function library 30. The microprocessors 20 may run one or more functions from the library 30, while interacting with the memory 10 when necessary.

The library 30 may be at least partially maintained on any memory device, ROM or RAM, removable or not, writable or not. The library 30 may for example be partially maintained on a computer hard drive, on an optical data medium, on the computer's RAM, or other devices.

The device 1A includes a first data storage 100, organized in memory 10 and adapted to store a representation of a surface to be processed in a numerical form.

Numerically, the surface to be processed may be defined in multiple forms, such as one or more image files, one or more surface mesh files, one or more files from computer assisted design software, one or more parametric equations, a file having the coordinates for a set of points, or others.

The device 1A also has second data storage 102, organized in the memory 10 and designed to store a representation of one or more triangles in the space in a numerical form.

The second data storage 102 is organized into a structure that connects, for each storage triangle, a triangle identifier, data for defining a support plane for that triangle, and spatial coordinate values for each of the apices of the triangle in question.

Here, each support plan is defined by an equation of the type indicated in Annex A.1.1. In that annex, and in the rest of the present description, Nj is a third dimension vector and Bj is a scalar quantity, which, combined with one another, define a plane of the space. The plane defined by the vector Nj and the scalar quantity Bj can be designated Fj.

In the second data storage 102, the data for defining a support plan Fj may include data for defining the vector Nj and the scalar quantity Bj.

FIGS. 2 to 4 show an example of the second data structure 102 in the form of an assembly including a first table 1000, or table Tab1, a second table 1002, or table Tab2, and a third table 1004, or table Tab3.

Each row of the table Tab1 (FIG. 2) maintains a relationship between a point identifier, for example a pointer value, or index value, generically denoted qj, and spatial coordinate values, for example as projections on the different axes of an orthonormal reference. These coordinate values are generically and respectively denoted qjx, qjy and qjz for the point qj.

In practice, the reference in question is chosen so as to correspond to the data contained in the files defining the surface, if applicable.

Here, as in the rest of the present description, it must be understood that the storage of the identification data, for example the pointer or index values, is optional. This data has been mentioned here, and shown in the drawings, to assist with understanding of the invention. In practice, the boxes of the tables shown are adjacent in the memory: this makes the index diagram implicit and means that there is virtually no reason to store identification data, and more generally index values, in memory.

Each row of the table Tab2 (FIG. 3) maintains a relationship between a triangle identifier, for example a pointer value, generically denoted Tj, and the identifiers of each of the points forming an apex of said triangle as stored in the table Tab1, or a pointer toward the corresponding rows of said table Tab1. For example, the triangle Tj has the points qm, qn and qp as apices, the coordinates of which are stored in the table Tab1.

Each row of the table Tab3 (FIG. 4) maintains a relationship between a triangle identifier, as stored in the table Tab2, or a pointer to the corresponding row of said table Tab2, and values defining a support plane. For a generic triangle, denoted Tj, these values comprise the vector value Nj projected on the basis of an orthonormal reference, respectively denoted Njx, Njy and Njz, and a scalar value Bj.

The device 1A also comprises third data storage 104, organized in the memory 10 and adapted to store a representation of one or more points of the space in a numerical form.

The third data storage 104 is organized according to a structure that connects, for each stored point, a point identifier, for example a pointer value, and a set of spatial coordinates for that point.

FIG. 5 shows an example embodiment of the third data storage in the form of a fourth table 1006, or table 4.

Each row of the table Tab4 maintains a relationship between a point identifier, for example a pointer value, generically denoted Xj, and spatial coordinate values for that point, for example as projections on the axes of an orthonormal reference. For a generic point Xj, these coordinates are respectively denoted xj, yj and zj in the table Tab4.

The device 1A also comprises fourth data storage 106, organized in the memory 10 and adapted to store a representation of one or more spatial cells in a numerical form.

The fourth data storage 106 is organized according to a structure that connects, for each cell, a cell identifier, data for defining each of the planes delimiting the cell in the space. Optionally, the structure of the fourth data storage 106 also connects each cell identifier with coordinate values for a point in space.

The data for defining a plane may comprise data for defining a vector and a scalar quantity, according to the equation in Annex A.1.1.

FIG. 6 shows an example embodiment of the fourth data storage 106 in the form of a fifth table 1008, or table Tab5.

Each row of the table Tab5 maintains a relationship between a plane identifier, for example a pointer value, generically denoted Pj, vector values Nj projected based on an orthonormal reference, respectively denoted Njx, Njy and Njz, and a scalar value Bj, a first cell identifier Vk, and a second cell identifier Vl.

Optionally, a complementary table (not shown) may, in each of its rows, maintain a relationship between a cell identifier and the coordinates of a point in space, or the identifier of a point whereof the spatial coordinates are kept in other storage.

The device 1A also comprises a fifth data storage 108, organized in the memory 10 and adapted to store a representation of one or more polygons in the space in a numerical form, as well as symbolic data and typing data relative to each polygon apex.

The fifth data storage 108 is organized according to a structure that connects, for each polygon, a polygon identifier, a definition of each apex of said polygon, a definition of the support plane of that polygon, and, optionally, data indicating belonging to a polygon set as a subset of stored polygons. The structure of the fifth data storage 108 also maintains a relationship between each apex identifier and a set of symbolic data on the one hand and at least one typing datum on the other hand.

Storing the definition of the support plane is optional: each time, the support plane may be deduced from other stored values. In practice, however, the device 1A has improved efficiency (calculation time) when this support plane is stored.

FIG. 7 shows an example of the fifth data storage 108 in the form of a sixth table 1010, or table Tab6.

Each row of the table Tab6 maintains a relationship between an apex identifier, for example a pointer value, generically denoted Sj, spatial coordinate values, for example as projection values in an orthonormal reference, denoted Sjx, Sjy and Sjz for an apex Sj, a polygon identifier Lk, a typing datum Rj, and a set of symbolic data Symbj, or a pointer to such data.

According to one example illustrated in FIG. 8, the fifth data storage 108 also includes a seventh table 1012, or table Tab7, each row of which maintains a relationship between a polygon identifier Lj and a point identifier Xi equivalent to a pointer toward coordinate values for that point in space.

The device 1A also has a sixth data storage 110, organized in memory 10 and adapted to store a representation of one or more triangles of the space in a numerical form.

The sixth data storage 110 is organized according to a structure that connects, for each triangle, a triangle identification datum, spatial coordinate data for each of the apices of said triangle, data for defining a support plane for said triangle, and coordinate values for a point in space.

FIG. 9 shows one example embodiment of the sixth data storage 110 in the form of an eighth table 1014, or table Tab7.

Each row of the table Tab7 maintains a relationship between a triangle identifier, for example a pointer value, generically denoted Tj, the identifiers for three points forming apices, denoted for Cj1, Cj2 and Cj3 for a triangle Tj, and an additional point identifier Dk.

Alternatively, the sixth storage 110 may assume a form similar to the examples illustrated in FIGS. 2 to 4.

The library 30 has a division function 300 adapted to establish a data set representing a collection of planar geometric elements as a breakdown of a three-dimensional surface. The first division function 300 is adapted to establish data defining a collection T of triangles Tj as the breakdown of said surface.

Here, these definition data include a set of coordinate values for each of the apices of each triangle Tj, as well as data for defining a support plane for each of said triangles. The first division function 300 may be seen here as a triangulation function.

The first division function 300 may be called upon with a perimeter datum defining the number of triangles Tj of the set T. The value of the integer m may be provided using the division function 300 and/or established at a default value. The value of the integer m contributes to defining the fineness of the division of the surface to be processed.

In another example, the first division function 300 is arranged so as to call on a division or triangulation function outside the device 1A.

Furthermore, the first division function 300 may be optional in certain cases.

The library 30 also comprises a generation function 302 adapted to establish a data set for locating a collection of points from data representing a surface. This location data is established such that the points are distributed randomly, or pseudo-randomly, over the surface in question.

In one embodiment, the generation function 302 is adapted to receive data representing a collection of triangles as data for defining the surface to be processed. This data may comprise location data for each of the apices of each triangle as well as data representing a support plane for each of the triangles. The location data may comprise coordinate values in an orthonormal reference. Each support plane may be defined using data for defining a vector Nj and a scalar quantity Bj, according to the equation of Annex A.1.1.

The generation function 302 is adapted to establish location data for each point of the collection, for example in the form of a set of coordinate values.

The generation function 302 accepts, as perimeter, an integer value, denoted n, determining the number of points of the collection. The value of the parameter n may be provided using the generation function 302 or established from a predetermined default value. Each generated point is such that it belongs to one of the support planes and is within the triangle corresponding to that support plane.

The value of the integer n is a parameter of the generation function 302, and more generally the device for aiding with mesh production. It determines a size order of the number of desired meshes. The value of the integer n may be conveyed as a parameter using the generation function 302. For most of the applications of the device 1A, the value of the parameter n is higher than the value of the parameter m.

In another replacement or complementary embodiment, the generation function 302 is adapted to generate the collection of points from one or more parametric equations as surface definition.

Alternatively, the generation function 302 may be adapted to allow manual definition of at least some of the points of the collection, for example by inputting coordinates, or pointing to a graphic representation of the surface to be processed using a graphic user interface.

When the surface S is defined in a mathematical form, the points are generated so as to belong to the surface S, to within numerical precision.

Although the performance of the device 1A is largely independent of the collection of points, it is preferable for said points to be distributed substantially uniformly over the surface to be processed: this substantially improves the calculation performance.

The library 30 has a partitioning function 304 establishing a data set representing a collection of spatial cells in a numerical form, from a data set representing a collection of points in space in a numerical form.

The collection of cells here corresponds to the breakdown of the space into so-called Voronoi cells calculated from the collection of points. Each of these points forms the center of a Voronoi cell.

The partitioning function 304 may be adapted to calculate data defining the set of the boundary planes of each Voronoi cell in a numerical form. These data may comprise the data necessary for a Cartesian definition of each boundary plane, for example the values of a vector Nj projected on the basis of a reference and a scalar quantity Bj, according to the equation for a plane provided in Annex A.1.1.

The library 30 also includes an intersection function 306, establishing a data set representing the result of the intersection of a collection of spatial cells and a surface of the space, in a numerical form. In other words, the intersection function 306 determines a restricted set of cells relative to a given surface, from a given set of cells.

The intersection function 306 may be adapted to receive a data set defining a collection of triangles as surface of the space, on the one hand, and a data set defining a collection of spatial cells, on the other hand, and to establish, based on said data sets, a data set defining a collection of polygons of the space as intersection of the collection of triangles and the collection of spatial cells. Each triangle in the collection may be defined by the data defining its support plane, for example the values of a vector Nj projected on the basis of a reference and a scalar quantity Bj, location data for its apices, for example coordinate values in an orthonormal reference.

Each cell of the collection may be defined by data defining its boundary planes and location data for its center.

For each point forming a polygon apex, the intersection function 306 establishes one or more equations defining the location of that point as a function of location data of one or more apices of a triangle and location data for the center of a cell. This location data for example comprises coordinate values in a same orthonormal reference.

More generally, the intersection function 306 determines one or more equations determining location data for each point located at the intersection of the surface to be processed and a spatial cell.

The intersection function 306 is also adapted to determine the position of each of the polygon apices precisely, i.e. to resolve the equations determining the location data.

Each apex of the polygon may be defined using a set of equations defining three planes of the space.

The intersection function 306 is also adapted to establish typing data for each polygon apex, the value of said typing data depending on the configuration of that apex relative to the surface to be processed on the one hand, and the spatial cells on the other hand.

When the surface to be processed is represented by a set of triangles, the typing data may assume a first value, or "A" value, when the apex corresponds to an apex of one of the triangles, a second value, or "B" value, when the apex is located at the intersection of a triangle corner and a segment connecting two cell centers belonging to a same Delaunay triangle, a third value, or "C" value, when the apex is located on the support plane of a triangle, inside that triangle, and two segments respectively connecting three cells belonging to a same Delaunay triangle.

The article "Isotropically meshing with fast and exact computation of restricted Voronoi diagram," by D.-M. YAN, B. LÉVY, Y. LIU, F. SUN and W. WANG, Computer Graphics Forum 28, 5, 1445-1454 (2009) describes a method for accurately calculating a restricted Voronoi diagram over a surface defined by a triangle assembly, in particular section 3 thereof entitled "RVD computation." The contents of this article, and in particular section 3 thereof, are incorporated herein by reference. The invention is not limited to this method for computing the restricted Voronoi diagram: it encompasses all known and future methods.

The library 30 also includes a decomposition function 308 for establishing a data set representing a collection of triangles as the decomposition of a polygon.

Each apex of the polygon corresponds to at least one of the triangles of the collection, and each apex of a triangle of the collection corresponds to an apex of the polygon.

The device has a summation function 310 adapted to establish, from data representing a surface element of the space, and data representing a point of the space, a quantity representing the sum of the moments of points belonging to the surface element relative to said point in space, said moments being determined according to a selected normative function, potentially with the application of an adaptation matrix representative of an anisotropic field on the surface element. The selected normative function is of order higher than or equal to 1 when a non-identity adaptation matrix is applied, and of order strictly higher than two otherwise.

The summation function 310 computes the quantity Flp (T) defined by the formula of Annex A.2.2, where $M_T$ represents the anisotropy matrix, $x_0$ corresponds to the point relative to which the different moments are computed, and T designates the surface element on which the summation function 310 works.

The matrix $M_T$ increases the weight of certain components, i.e. favors certain directions in space relative to others. The moment is defined using a particular standard, defined in Annex A.1.8. This standard is defined based on the sum of the distance projected on the various axes making up an orthogonal reference, increased to a whole power p.

In other words, the summation function is capable of computing the sum of moments of points of work cells relative to points respectively associated with said work cells, said moments being determined according to a selected normative function, of order higher than or equal to two and/or according to an adaptation matrix representing an anisotropy field.

In the event the anisotropy matrix $M_T$ differs from the identity matrix, the whole power p may be equal to or greater than 1. Otherwise, this whole power p is greater than or equal to 2. Preferably, the value of the integer p is chosen to be even to simplify the calculations.

The normative function may be of infinite order, i.e., considered the boundary of a normative function of order p, when p tends to infinity. The function Flp(T) is then expressed according to the formula of annex A.2.8. In the general case of a set Ω of cells Ωi, the normative function Flp(X) of infinite order is expressed according to the formula of annex A.2.7.

Each geometric integration element may be divided into sectors, on each of which one of the coordinates X, Y or Z is higher than the others in absolute value, which greatly facilitates the calculation of the cumulative quantity. For example, each integration simplex can be divided into 4 sectors when it is a two-dimensional element, and into 8 sectors when it is a three-dimensional element.

When the surface element T assumes the form of a triangle, the summation function 310 establishes, as cumulative quantity corresponding to that element, the results of the evaluation of the formula of Annex A.2.3, combined with the formula of Annex A.2.4. Ci is a dimension vector 3 representing values of coordinates of an apex i of the triangle T expressed in the same orthonormal reference as the coordinates of the point $x_0$.

For the rest, the elements of formulas A.2.3 and A.2.4 are defined in Annex A.1.

The library 30 also comprises a bypass function 312 for evaluating a gradient value of the cumulative quantity relative to a set of points, for a geometric element of the space, from coordinates and equations for each of the apices of said element.

The bypass function 312 may be adapted to process triangular elements.

The bypass function then computes the gradient defined in Annex A.3.1 by applying the formulas of annexes A.3.2 to A.3.4 and A.3.6 to A.3.10.

For each of the apices C1, C2 and C3 of a triangle T, the function applies one of the formulas of annexes A.3.8, A.3.9 and A.3.10 as a function of typing data associated with that apex, according to the following table:

| Value of the typing data | Formula of the gradient |
| --- | --- |
| A | N/A |
| B | A.3.8 |
| C | A.3.9 |

The library 30 also has an improvement function 314 that establishes, based on data representing a set of points in space, an objective function value datum corresponding to that set of points, and a value datum for a gradient of that objective function relative to said set of points, data representing an improved set of points, i.e. capable of making said cumulative quantity evolve in a predetermined manner, so as to tend to minimize that cumulative quantity.

The improvement function 314 can implement any optimization method, in particular of the gradient descent, Newtonian or quasi-Newtonian type, for example the BFGS (Broyden-Fletcher-Goldfarb-Shanno) method or the "L-BFGS" ("limited memory BFGS") method. For more information on the L-BFGS method, see the following publications:

"On the Limited Memory Method for Large Scale Optimization," D. C. LIU and J. NOCEDAL, *Mathematical Programming B*, 45, 3, pages 503 to 528;

"A Limited Memory Algorithm for Bound Constrained Optimization," R. H. BYRD, P. LU and J. NOCEDAL, *SIAM Journal on Scientific and Statistical Computing*, 16, 5, pages 1190 to 1208.

The library 30 also comprises a post-processing function 316, which is explained later, and which makes it possible to obtain a hexahedral or cubic mesh from a set of points.

Figure 10:
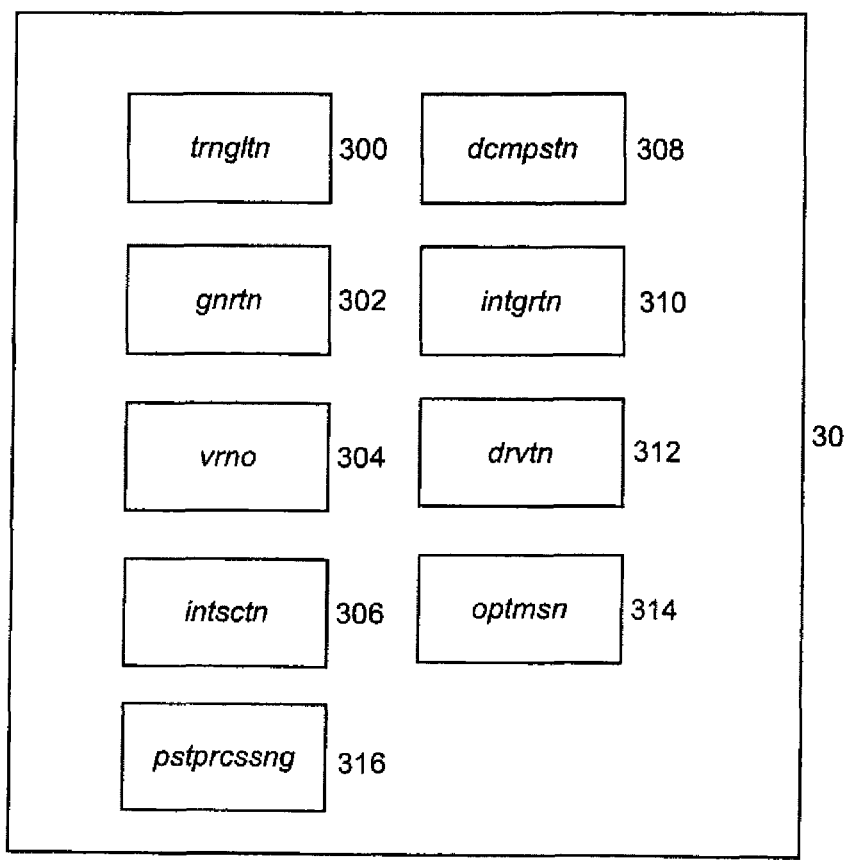
FIG. 10 shows a block diagram of part of the device of FIG. 1.
Figure 11:
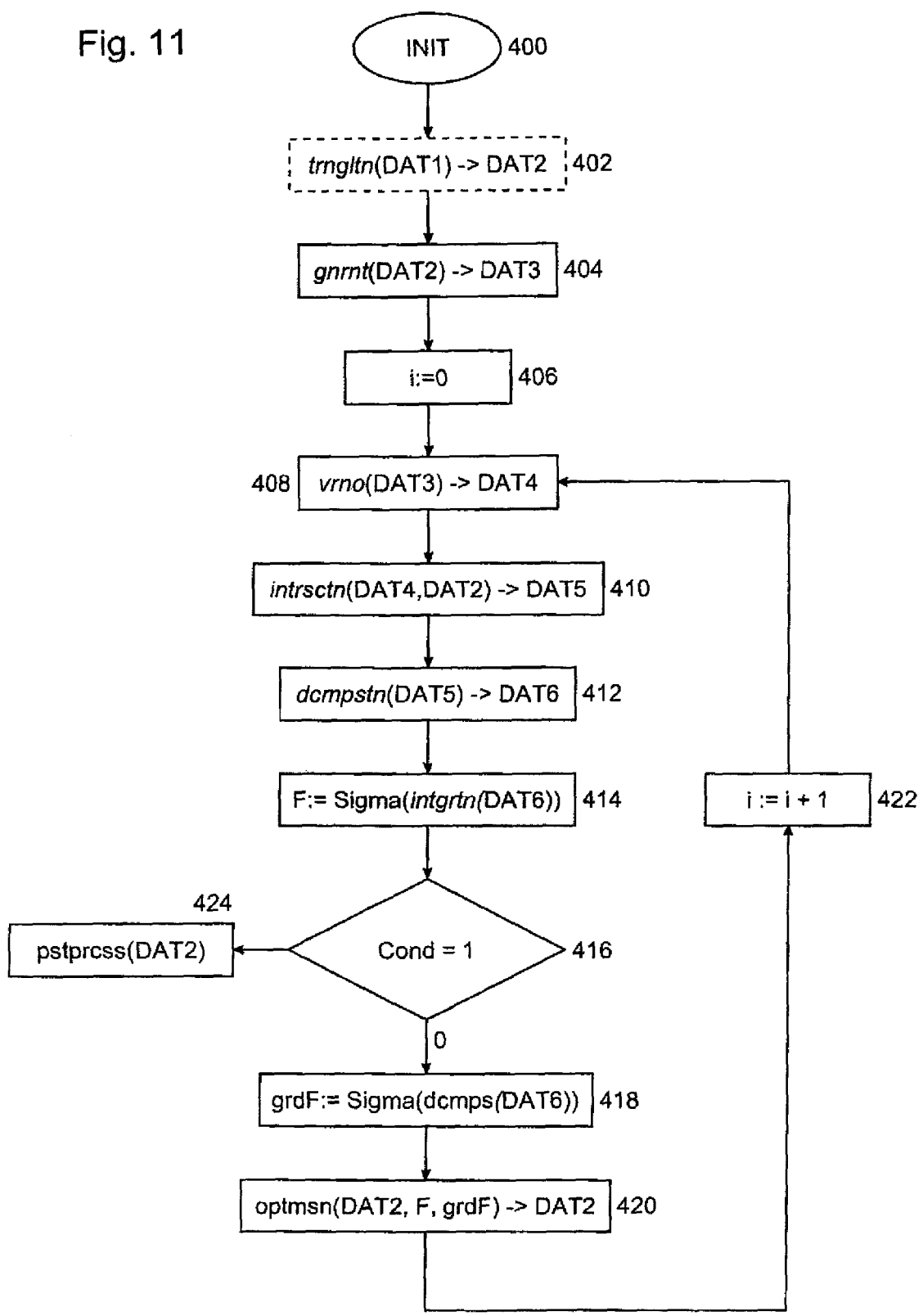
FIG. 11 shows a flowchart illustrating a control function for the device of FIG. 1.

The library 30 lastly comprises an optimization function 318, the operation of which is illustrated in FIG. 10.

In the operation 400, the optimization function is initialized. The internal values are set to 0, and the various storage structures of the memory 10 are emptied of the data they contain.

In the operation 402, the division function 300 is used with the data contained in the first storage 100. The division function 300 returns a set T of triangles Tj that is stored in the second storage.

Here, the operation 402 is shown in dashed lines because it is optional.

When the surface to be processed is maintained in the first storage 100 in a triangulated form, the operation 402 may be ignored. In the case where the surface to be processed has been defined in a triangulated form, however, the operation 402 may be carried out to obtain a different triangulation of the surface to be processed, for example having a different fineness (total number of triangles).

In the operation 404, the generation function 302 is used for the set T of triangles Tj contained in the second storage 102. Optionally, a natural integer value m is passed on as parameter. The generation function 302 returns a set X of points Xj (j being an integer that may vary from 1 to m) randomly generated and each belonging to at least one triangle Ti of the set T. A recording is created in the third data storage 104 for each point Xj.

During the operation 406, a variable is initialized forming a loop counter, denoted i.

During the operation 408, the partitioning function 304 is used with the data from the third storage 104. The partitioning function 304 returns a set Ω of Voronoi cells Ωi that is stored in the fourth data storage 106.

For example, a row is created in the table Tab5 for each boundary plane Pj. The identifiers of the points forming the respective centers of the cells in question, for example Xk and Xl, are stored as identifiers for cells associated with the plane Pj.

During the operation 410, the intersection function 306 is used with the data from the second storage 102 and data from the fourth storage 106. The intersection function 306 returns a set R of polygons Ri, which is stored in the fifth data storage 110. In particular, the equations determining the coordinates of each of the apices Sj of each of the polygons Ri are stored as symbolic data in the fifth data storage 108. The typing data is also stored.

In the operations 406 to 410, the optimization function, the partitioning function 304 and the intersection function 306 act, combined with one another, like a partitioner, capable of calculating three-dimensional work cells from a given initial points, said work cells each being associated with a point in space, and represented by numerical data organized according to a data structure.

In the operations 404 to 410, the optimization function and the generation function 302 act, combined with one another, like a tiling tool, capable of actuating the practitioner with a first set of initial points, defined relative to the surface to be processed, to obtain a first set of work cells.

In the operation 412, the decomposition function 308 is used with the data from the fifth storage 108. The decomposition function 308 returns a set T of triangles Tj whereof each apex corresponds to an apex of the set R of polygons Ri. The set T is stored in the sixth data storage 110. For example, a row is created for each triangle in the table Tab7 with the identifier Sj of one of the apices of the polygon maintained in the table Tab6 as the apex identifier Cji. The identifier Xj of the point forming the center of the corresponding Voronoi cell is stored as the complementary point identifier Dk. The optimization function 318 and the decomposition function 308, combined with one another, act as a resolver, capable of computing simple geometric elements from a work cell and its respective associated point, the apices of each simple geometric element having apices of the work cell or the respective associated point, and each apex of the work cell belonging to a simple geometric element.

In the operation 414, the summation function 310 is used with the data from the sixth storage 110. Each time, the result of a call is added to the result of the preceding calls. The result is stored in the form of a variable F. The optimization function 318 and the summation function 310 then act as an elevator, calculating a cumulative quantity representing the sum of the moments of the points of the work cells relative to their respective associated points, these moments being determined according to a selected normative function.

In the operation 416, a loop out condition is evaluated. This condition may pertain to a number of iterations already performed, for example an iteration number equal to a predefined value, reaching a computation power limit, and/or the value of F, for example the fact that the value of F is or is not below a floor value Fmin or the norm for the gradient of F is below an Epsilon floor value.

If the condition of the operation 416 is not verified, then in operation 418, the bypass function 312 is called with the data of the sixth storage 110. Each time, the result of a call for the bypass function 312 is added to the results of the preceding calls. The result is stored in the form of a variable gradF.

In the operation 420, the improvement function 314 is called with the content of the third storage, the values of F and gradF. The improvement function 314 returns an improved set of points that is stored in the third storage 104, replacing the previous set.

The loop counter is incremented in the operation 422, then one returns to the step 408.

In other words, the optimization function 318, combined with the improvement function 314, serves as an optimizer arranged to iteratively activate the tiling tool and the evaluator each time a set of initial points is drawn from the preceding sets, according to a rule calculated to minimize said cumulative quantity.

When the condition of the operation 416 is verified, the post-processing function 316 may be called with the data of the third storage 104. This operation is indicated in a dashed line, as it is optional.

Figure 12:
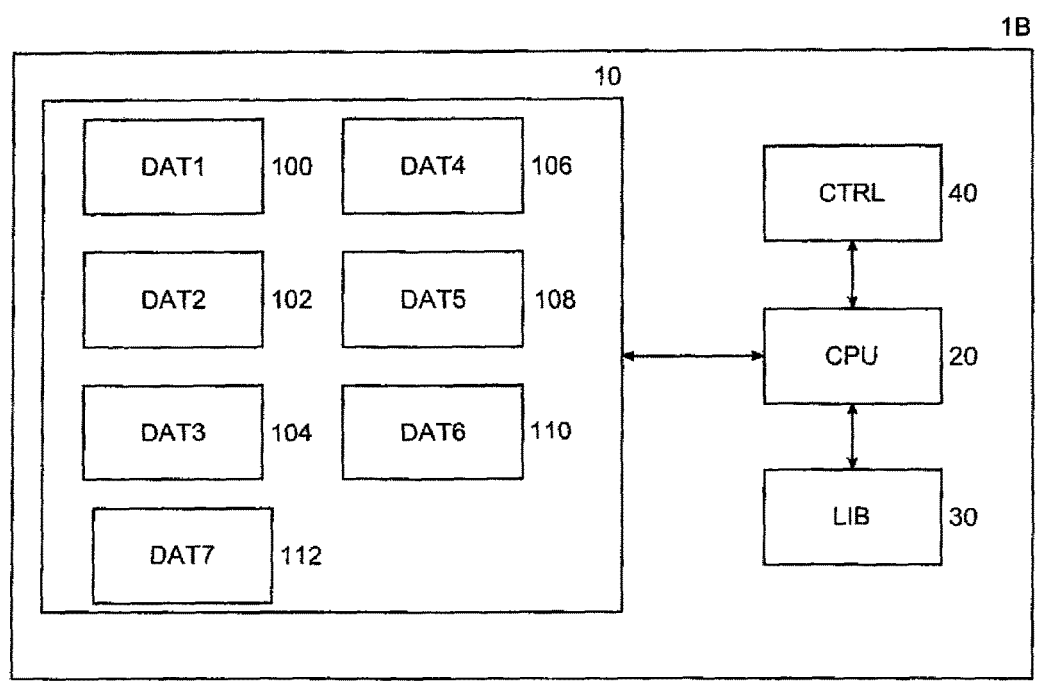
FIG. 12 is similar to FIG. 1 for a development of the mesh device of said FIG. 1.

FIG. 12 shows a device 1B for aiding in meshing a domain as a development of the device 1A. The device 1B is usable in particular when the domain in question assumes the form of a volume V at least partially delimited by a surface S.

The device 1B first differs from the device 1A in that it also comprises a seventh data storage 112, organized in memory 10, and able to store a representation of one or more cells of the space in a numerical form.

The seventh data storage 112 is organized according to a structure that connects, for each cell, cell identification data, spatial coordinate data for each of the apices of said cell, definition data for each of the boundary points of said cell, and coordinate data for a point of said cell or a pointer to such data.

FIG. 12 shows an example of the seventh data storage in the form of the ninth table 1016, or table Tab9, tenth table 1018, or table Tab10, and eleventh table 1020, or table Tab11.

Each row of the table Tab9 maintains a relationship between a point identifier, such as an index value, generically denoted qj, coordinate values of that point in an orthonormal reference, i.e. qjx, qjy and qjz for the point qj, and a cell identifier, for example Mk for the point qj.

Each row of the table Tab10 maintains a relationship between a plane identifier, such as an index value, generically denoted Pj, projection data of the vector Nj and scalar quantity Bj according to the definition of a plane Pj given in Annex A.1.1, denoted Njx, Njy, Njz and Bj, and cell identifier data Mk.

Each row of the table Tab11 maintains a relationship between a point identifier, such as an index value, generically denoted qj, coordinate values of that point in an orthonormal reference, i.e. qjx, qjy and qjz for the point qj, and a cell identifier, for example Mj for the point qj.

In this example, the sixth storage 110 maintains a cell point identifier, which makes it possible to store a representation of tetrahedrons in a numerical form as a dual of the Voronoi cells.

The device 1B differs from the device 1A also in that the points generated by the generation function 302 are randomly distributed inside the volume at least partially delimited by a surface represented in a numerical form. This surface can be defined by a set of triangles.

The device 1B also differs from the device 1A in that the data set resulting from the intersection function 306 corresponds to the intersection of a set of spatial cells and the volume delimited by a given surface. The intersection corresponds to a restricted set of spatial cells delimited by a given surface. The intersection corresponds to a set of spatial cells restricted by the volume delimited by the given surface. This surface can be defined by a set T of triangles Tj.

The typing data attributed to each apex of the result cell can assume a fourth value, or "D" value, when the apex corresponds to an apex of an initial spatial cell.

In the device 1B, the decomposition function 308 is modified so as to establish a data set representing a collection of tetrahedrons from a data set representing a spatial cell associated with a point of that cell. The tetrahedron collection corresponds to a decomposition of the spatial cell: each tetrahedron has an apex formed by the point associated with the cell and three apices formed by apices of said cell, each apex of the cell forming an apex of at least one tetrahedron.

The integration function 310 is modified so as to implement the formula of annex A.2.2, in which T now designates a volume element.

In the case where the surface to be processed is represented in a triangular form, the volume element assumes the form of the tetrahedron including the apices $x_0$, C1, C2, C3. The integration function 310 can then compute the cumulative quantity by evaluating the formula of annex A.2.5, which must be considered in combination with the formula of annex A.2.6.

In this case, the bypass function 312 can evaluate the formula of annex A.3.1 in combination with the formulas of annexes A.3.2, A.3.3 and A.3.5 to A.3.10. This last formula is applied when the typing data of the apex C assumes the value "D."

As shown in FIG. 16, the optimization function 318 is modified so as to store the result of the call for the intersection function 306 in the seventh data structure (operation 410) and to call on the summation function 310 over the data contained in this seventh storage (operation 412).

The post-processing function 316 is arranged to calculate the Delaunay triangulation corresponding to a given set of points. The post-processing function is also arranged to group together the tetrahedrons (or triangles) resulting from the Delaunay triangulation so as to form a maximum number of hexahedrons (or quadrilaterals), while respecting the minimum admissible angles. This can be done using the method described in the article "Generating a Mixed Mesh of Hexahedra, Pentahedra and Tetrahedra from an Underlying Tetrahedral Mesh" by S. MESHKAT and D. TALMOR, International Journal for Numerical Methods in Engineering, volume 49, pages 17 to 30, 2000.

In one alternative example, the post-processing function 316 is arranged to compute the three-dimensional Voronoi diagram corresponding to a set of given points, then to arrange the cells thus obtained in cubic elements.

The invention can be described relative to the devices 1A and 1B.

It appears that this invention may also be expressed in the form of a method to aid production of a mesh, which may be illustrated by FIG. 10 in particular.

This method includes a step for storing numerical data defining a surface to be processed, for example corresponding to the operation 402.

In the following step, for example corresponding to the operations 404 to 410, a first set of three-dimensional work cells is calculated from a first set of initial points, said work cells each being associated with a point in space.

The operation 414 is comparable to a step for computing a cumulative quantity representing the sum of the moments of the points of the work cells with respect to the respective associated points of said cells, said moments being determined according to a selected normative function, of order higher than or equal to 2 and/or according to an adaptation matrix representing an anisotropy field.

These last two steps are repeated iteratively each time a set of initial points is drawn from the previous sets, according to the operation 420, according to a rule calculated to minimize the cumulative quantity in question.

The steps of the method may be carried out by a series of instructions, for example in the form of a computer program. This program may be stored on any data medium, in particular of the optical type.

Below are several publications dealing with anisotropic meshing.

"Anisotropic Polygonal Remeshing," P. ALLIEZ, D. COHEN-STEINER, O. DEVILLERS, B. LÉVY, and M. DESBRUN, ACM Transactions on Graphics, volume 22, number 3, pages 485-493, July 2003. In this document, it is proposed to draw the lines of curvature.

"Variational shape approximation," D. COHEN-STEINER, P. ALLIEZ and M. DESBRUN, SIGGRAPH conference proceedings, 2004. In this document, it is proposed to minimize the approximation error directly.

"Tetrahedral mesh generation and optimization based on centroidal Voronoi tessellations," Q. Du and D. Wang, International Journal for Numerical Methods in Engineering, volume 56, pages 1355 to 1373, 2003. In this document, it is proposed to generalize the notion of CVT with a continuous anisotropy field. This notion was only experimented in two dimensions.

"Generic remeshing of 3D triangular meshes with metric-dependent discrete Voronoi diagrams," S. VALETTE, J.-M. CHASSERY and R. PROST, IEEE Transactions on Visualization and Computer Graphics, volume 14, pages 369 to 381, 2008. In this document, the same definition of anisotropy is used as in the preceding document. A discrete approximation is proposed, however, operating based on a pre-triangulation of the domain. Anisotropic and approximate Voronoi cells are therefore used. It requires implementing a relaxation method to produce the objective function converge. It does not make it possible to obtain a tetrahedral-dominant mesh.

"Anisotropic Voronoi diagrams and guarantee-quality anisotropic mesh generation," F. LABELLE, J. R. SHEWCHUK, SCG '03: Proceedings of the nineteenth annual symposium on Computational geometry, pages 191 to 200, 2003. This document proposes a generalization of the Voronoi diagrams by defining an anisotropy attached to the apices.

"Fully-Automated Hex-Dominant Mesh Generation with Directionality Control via Packing Rectangular Solid Cells," S. YAMAKAWA and K. SHIMADA, International Journal for Numerical Methods in Engineering, volume 57, pages 2099 to 2129, 2003. This document proposes a heuristic method called "bubble packing," which is practically ineffective on an industrial scale (increase of the number of meshes between 500,000 and 1 million).

Several publications are also be cited relative to meshing with quadrilateral elements.

"Localized Quadrilateral Coarsening," J. DANIELS-II, C. T. SILVA, and E. COHEN, Computer Graphics Forum, volume 28, pages 1437 to 1444, 2009, proposes directly transforming, and optimizing, meshings done with quadrilateral elements.

"Automatic Conversion of Triangular Meshes into Quadrilateral Meshes with Directionality," T. ITOH and K. SHIMADA, International Journal of CAD/CAM, 2001, proposes adapting the bubble packing method to optimize the quadrilaterals on surfaces. This method suffers from the same drawbacks as those of bubble packing, among others.

"Quad-Dominant Mesh Adaptation Using Specialized Simplicial Optimization," K-F. TCHON and R. CAMERERO, 15$^{th}$ International Meshing Roundtable conference proceedings, pages 21 to 38, 2006, and "An Incremental Approach to Feature Aligned Quad Dominant Remeshing," Y.-K. LAI, L. KOBBELT and S.-M. HU, ACM SPM conference proceedings, pages 137 to 145, 2008, proposing an adaptation of a meshing with quadrilateral elements from very high-definition triangular meshings.

"Spectral surface quadrangulation," S. DONG, P.-T. BREMER, M. GARLAND, V. PASCUCCI, and J. C. HART, ACM Transactions on Graphics, volume 25, number 3, pages 1057 to 1066, 2006, and "Spectral quadrangulation with orientation and alignment control," J. HUANG, M. ZHANG, J. MA, X. LIU, L. KOBBELT, and H. BAO, ACM Transactions on Graphics, volume 27, article number 147, page 9, 2008, propose using the Morse set for a specific Laplace function.

"Planar Parameterization for Closed Manifold Genus-g Meshes Using Any Type of Positive Weights," D. STEINER and A. FISCHER, Journal of Computing and Information Science Engineering, volume 5, number 2, 2005, "Designing quadrangulations with discrete harmonic forms," Y. TONG, P. ALLIEZ, D. COHEN-STEINER, and M. DESBRUN, SGP '06: Proceedings of the fourth Eurographics symposium on Geometry processing, 2006, and "Surface Parameterization using Branched Coverings," F. KALBERER, M. NIESER and K. POLTHIER, Computer Graphics Forum, volume 26, 2007, propose forming u, v iso line contours with a defined surface in a parametric form.

"Periodic global parameterization," N. RAY, W. C. LI, B. LÉVY, A. SHEFFER and P. ALLIEZ, ACM Transactions on Graphics, volume 25, number 4, pages 1460 to 1485, 2006, and "Mixed-integer quadrangulation," D. BOMMES, and H. ZIMMER, and L. KOBBELT, ACM Transactions on Graphics, volume 28, number 3, 2009, propose using periodic functions and optimization partially with integers.

All of the methods proposed in these documents deal with objects with sharp corners, which requires that the user define certain constraints manually. On the contrary, the proposed device reconstructs such corners itself, without any user intervention, in particular in terms of data labeling.

We lastly cite several publications relative to meshing a volume with hexahedral elements.

"Methods for Multisweep Automation," J. SHEPHERD, S. A. MITCHELL, P. KNUPP and D. WHITE, $9^{th}$ International Meshing Roundtable Conference Proceedings, 2000, proposes a direct multisweep-based method.

"Unconstrained Paving and Plastering: A New Idea for All Hexahedral Mesh Generation," M. L. STATEN, S. J. OWEN, and T. D. BLACKER, International Meshing Roundtable Conference Proceedings, 2005, proposes a direct paving and plastering method.

"Advances in octree-based all-hexahedral mesh generation: handling sharp features," L. MARÉCHAL, $18^{th}$ International Meshing Roundtable Conference Proceedings, 2009, proposes a direct octree-based method.

"Volumetric parameterization and trivariate B-spline fitting using harmonic functions," T. MARTIN, E. COHEN, and M. KIRBY, SPM '08: Proceedings of the 2008 ACM Symposium on Solid and physical modeling, 2008, proposes a direct method based on producing a contour of a parametrically-defined volume.

"Tensor-Guided Hex-Dominant Mesh Generation with Targeted All-Hex Regions," V. VYAS and K. SHIMADA, $18^{th}$ International Meshing Roundtable Conference Proceedings, 2009, proposes a direct method using the flux surfaces of a tensor field.

"H-Morph: An Indirect Approach to Advancing Front Hex Meshing," S. J. OWEN and S. SAIGAL, International Journal for Numerical Methods in Engineering, volume 49, 2000, proposes an indirect method providing for construction of a mesh with tetrahedral elements and transforming that mesh into a hexahedral-dominant mesh using a frontal approach.

"Anisotropic Tetrahedral Meshing via Bubble Packing and Advancing Front," S. YAMAKAWA and K. SHIMADA, International Journal for Numerical Methods in Engineering, 2003, proposes producing this first mesh using the bubble packing method with cubic cells. This is an essentially heuristic method that is difficult to calculate and does not scale up well. On the contrary, the proposed device uses an objective function defined in an analytical form that is easy to calculate and not particularly sensitive to scaling up, in particular for use in an industrial setting.

The invention is not limited to the embodiments described above, which have been provided solely as an example. On the contrary, the present invention encompasses all alternatives conceivable by those skilled in the art.

Annex 1—Notation Conventions $$N_j x + B_j = 0 \quad \text{A.1.1}$$

$$V[x,y,z] \quad \text{A.1.2}$$

$$V1[x_1,y_1,z_1] \quad \text{A.1.3}$$

$$V2[x_2,y_2,z_2] \quad \text{A.1.4}$$

$$V_1 * V_2 = [x_1 x_2, y_1 y_2, z_1 z_2]^t \quad \text{A.1.5}$$

$$V^\alpha = V * V * \ldots * V (\alpha \text{ times}) \quad \text{A.1.6}$$

$$\overline{V} = x + y + z \quad \text{A.1.7}$$

$$\|V\|_p^p = |x|^p + |y|^p + |z|^p \quad \text{A.1.8}$$

$$U_i = M_T(C_i - x_0) \quad \text{A.1.9}$$

$$dA/dB = (\partial a_i / \partial b_j)_{ij} \quad \text{A.1.10}$$

$$\|V\|_\infty^\infty = \max\{|x|,|y|,|z|\} \quad \text{A.1.11}$$

Annex 2-Objective function $$F_{L_p}(X) = \sum_i \int_{\Omega_i \cap \Omega} \|M_y[y - x_i]\|_p^p dy \quad \text{A.2.1}$$

$$F_{L_p}^T = \int_T \|M_T(y - x_0)\|_p^p dy \quad \text{A.2.2}$$

$$F_{L_p}^T = \frac{|T|}{\binom{2+p}{2}} \sum_{\alpha+\beta+\gamma=p} \frac{\overline{U_1^\alpha * U_2^\beta * U_3^\gamma}}{E_{L_p}^T} \quad \text{A.2.3}$$

$$|T| = 1/2 \|N\| \quad \text{A.2.4}$$

$$F_{L_p}^T = \frac{|T|}{\binom{3+p}{3}} \sum_{\alpha+\beta+\gamma=p} \frac{\overline{U_1^\alpha * U_2^\beta * U_3^\gamma}}{E_{L_p}^T} \quad \text{A.2.5}$$

$$|T| = 1/6 \, U_1 \cdot (U_2 \times U_3) \quad \text{A.2.6}$$

$$F_{L_p}(X) = \sum_i \int_{\Omega_i \cap \Omega} \|M_y[y - x_i]\|_\infty^\infty dy \quad \text{A.2.7}$$

$$F_{L_p}^T = \int_T \|M_T(y - x_0)\|_\infty^\infty dy \quad \text{A.2.8}$$

Annex 3-Objective function gradient $$\frac{dF_{L_p}^T(x_0, C_1, C_2, C_3)}{dX} = \frac{dF_{L_p}^T}{dx_0} + \frac{dF_{L_p}^T}{dC_1}\frac{dC_1}{dX} + \frac{dF_{L_p}^T}{dC_2}\frac{dC_2}{dX} + \frac{dF_{L_p}^T}{dC_3}\frac{dC_3}{dX} \quad \text{A.3.1}$$

$$dF_{L_p}^T = d(|T|E_{L_p}^T) = E_{L_p}^T d|T| + |T|dE_{L_p}^T \quad \text{A.3.2}$$

$$\frac{dE_{L_p}^T}{dU_1 U_2 U_3} = \begin{bmatrix} \sum_{\alpha+\beta+\gamma=p;\alpha\geq 1} \alpha U_1^{\alpha-1} * U_2^\beta * U_3^\gamma \\ \sum_{\alpha+\beta+\gamma=p;\beta\geq 1} \beta U_1^\alpha * U_2^{\beta-1} * U_3^\gamma \\ \sum_{\alpha+\beta+\gamma=p;\gamma\geq 1} \gamma U_1^\alpha * U_2^\beta * U_3^{\gamma-1} \end{bmatrix}^t \quad \text{A.3.3}$$

$$\frac{d|T|}{dU_1 U_2 U_3} = \frac{-1}{2|T|}[N \times (U_2 - U_3)]^t [N \times (U_3 - U_1)]^t [N \times (U_1 - U_2)]^t \quad \text{A.3.4}$$

$$\frac{d|T|}{dU_1 U_2 U_3} = 1/6 \left([U_2 \times U_3]^t [U_3 \times U_1]^t [U_1 \times U_2]^t\right) \quad \text{A.3.5}$$

$$\frac{dF_{L_p}^T}{dC_i} = \frac{dF_{L_p}^T}{dU_i} M_T \quad \text{A.3.6}$$

$$\frac{dF_{L_p}^T}{dx_0} = -\frac{dF_{L_p}^T}{dC_1} - \frac{dF_{L_p}^T}{dC_2} - \frac{dF_{L_p}^T}{dC_3} \quad \text{A.3.7}$$

-continued $$dC = \begin{pmatrix} [x_1-x_0]^t \\ [N_1]^t \\ [N_2]^t \end{pmatrix}^{-1} \begin{pmatrix} [C-x_0]^t & [x_1-C]^t \\ [C-x_0]^t & 0 \\ 0 & 0 \end{pmatrix} \quad A.3.8$$

$$dC = \begin{pmatrix} [x_1-x_0]^t \\ [x_2-x_0]^t \\ [N_1]^t \end{pmatrix}^{-1} \begin{pmatrix} [C-x_0]^t & [x_1-C]^t & 0 \\ [C-x_0]^t & 0 & [x_2-C]^t \\ 0 & 0 & 0 \end{pmatrix} \quad A.3.9$$

$$dC = \begin{pmatrix} [x_1-x_0]^t \\ [x_2-x_0]^t \\ [x_3-x_0]^t \end{pmatrix}^{-1} \begin{pmatrix} [C-x_0]^t & [x_t-C]^t & 0 & 0 \\ [C-x_0]^t & 0 & [x_2-C]^t & 0 \\ [C-x_0]^t & 0 & 0 & [x_3-C]^t \end{pmatrix} \quad A.3.10$$

The invention claimed is:

1. A device for aiding the production of a mesh, comprising one or more computers and a memory storing:
   first numerical data defining a surface to be processed, said first numerical data being organized according to a first data structure;
   a partitioner, capable of calculating three-dimensional work cells from given initial points, said work cells each being associated with a point in space, and represented by second numerical data organized according to a second data structure;
   a tiling tool, capable of actuating the partitioner with a first set of initial points, defined relative to the surface to be processed, to obtain a first set of work cells;
   an evaluator, calculating a cumulative quantity representing the sum of the moments of the points of the work cells relative to their respective associated points, said moments being determined according to at least one of a selected normative function, of order higher than or equal to two and according to an adaptation matrix representing an anisotropy field;
   an optimizer arranged to actuate iteratively the tiling tool and the evaluator with, on each occasion, a set of initial points drawn from the previous sets, according to a rule calculated so as to tend to minimize said cumulative quantity;
   wherein the partitioner calculates a set of Voronoi cells from the given initial points and calculates the work cells as a restriction of the set of Voronoi cells relative to the surface to be processed according to predefined rules; and
   wherein the tiling tool actuates the partitioner with a first set of initial points belonging to the surface to be processed, and wherein the work cells cultivated by the partitioner correspond to the intersection of the Voronoi cells on the surface to be processed.

2. The device according to claim 1, wherein the tiling tool actuates the partitioner with a first set of initial points comprised in a volume at least partially delimited by the surface to be processed, and wherein the calculated work cells correspond to the intersection of said volume and the Voronoi cells.

3. The device according to claim 1, wherein the normative function is of even order.

4. The device according to claim 1, wherein the normative function is of infinite order.

5. The device according to claim 1, wherein the evaluator is arranged to calculate a derived cumulative quantity representing a gradient of such a cumulative quantity relative to the respective points of the work cells.

6. The device according to claim 5, wherein the optimizer is arranged to actuate the tiling tool and the evaluator with, on each occasion, a set of initial points resulting from an improvement function taking into account said cumulative quantity, the previous set of points and the derived cumulative quantity.

7. The device according to claim 6, wherein the improvement function implements an optimization method of the gradient descent type, the Newtonian type or the quasi-Newtonian type.

8. The device according to claim 7, wherein the evaluator calls a decomposer with all of the work cells, and calculates a cumulative quantity on each simple geometric element returned by the decomposer.

9. The device according to claim 1, further comprising a decomposer capable of calculating simple geometric elements from a work cell and its respective associated point, the apices of each simple geometric element comprising apices of the work cell or the respective associated point, and each apex of the work cell belonging to a simple geometric element.

10. The device according to claim 1, wherein the partitioner is arranged to associate, with each apex of a work cell, a typing datum as a function of the position of that apex relative to the surface to be processed.

11. The device according to claim 10, wherein the typing data associated with each apex also depends on the position of the apex relative to the Voronoi cells.

12. The device according to claim 10, wherein the evaluator calculates at least part of the derived cumulative quantity using a function selected according to the typing data associated with the apex in question.

13. The device according to claim 1, comprising a post-processing tool producing an essentially hexahedral mesh based on the last calculated set of initial points.

14. A method for aiding the production of a mesh, comprising a processor configured to execute the following steps:
   storing, in a non-transient memory, first numerical data defining a surface to be processed;
   calculating a first set of three-dimensional work cells from a first set of initial points, said work cells each being associated with a point in space;
   calculating a cumulative quantity representing the sum of the moments of the points of the work cells relative to the respective associated points of said cells, said moments being determined according to at least one of a selected normative function, of order higher than or equal to two and according to an adaptation matrix representing an anisotropy field;
   iteratively repeating the two calculating steps each time a set of initial points is drawn from the previous sets, according to a rule calculated to tend to minimize said cumulative quantity;
   wherein the first calculating step comprises calculating a set of Voronoi cells from a first set of initial points and calculating, as the work cells, a restriction of the set of Voronoi cells relative to the surface to be processed according to predefined rules;
   wherein the points of the first set of initial points each belong to the surface to be processed, and
   wherein said restriction comprises the intersection of the Voronoi cells on the surface to be processed.

15. The method according to claim 14, wherein the first set of initial points is comprised in a volume at least partially delimited by the surface to be processed, and wherein said restriction comprises the intersection of said volume and the Voronoi cells.

16. The method according to claim 14, wherein the iteratively repeating step comprises the following steps:
  calculating a cumulative quantity derived from the gradient of said cumulative quantity relative to the respective points of the work cells;
  calculating a set of initial points resulting from an optimization function taking into account said cumulative quantity, the previous set of points and the derived cumulative quantity;
  iteratively repeating the two calculating steps each time a set of initial points is drawn from the initial points calculation step.

17. The method according to claim 16, wherein the optimization function implements a method of the gradient descent type, Newtonian type, or quasi-Newtonian type.

18. The method according to claim 14, wherein the calculating the cumulative quantity step comprises the following steps:
  calculating simple geometric elements from each work cell and its respective associated point, the apices of each simple geometric element comprising apices of the work cell or the respective associated point, and each apex of the work cell belonging to a simple geometric element;
  calculating the cumulative quantity on each simple geometric element.

19. The method according to claim 14, wherein the calculating the restriction of the set step comprises the following steps:
  calculating the coordinates of each apex of each work cell, as restriction of the set of Voronoi cells relative to the surface to be processed according to predefined rules;
  associating a typing datum with each apex as a function of the position of the apex relative to the surface to be processed.

20. The method according to claim 19, wherein the calculating the cumulative quantity step comprises the following steps:
  calculating a cumulative quantity representing the sum of the moments of the points of the work cells relative to their respective associated points, said moments being determined according to at least one of a selected normative function, of order higher than or equal to two and according to an adaptation matrix representing an anisotropy field;
  calculating a derived cumulative quantity using a function chosen according to the typing datum associated with the apex in question.

21. The method according to claim 14, further comprising the following step:
  producing an essentially tetrahedral mesh based on the last calculated set of initial points.

* * * * *